United States Patent Office.

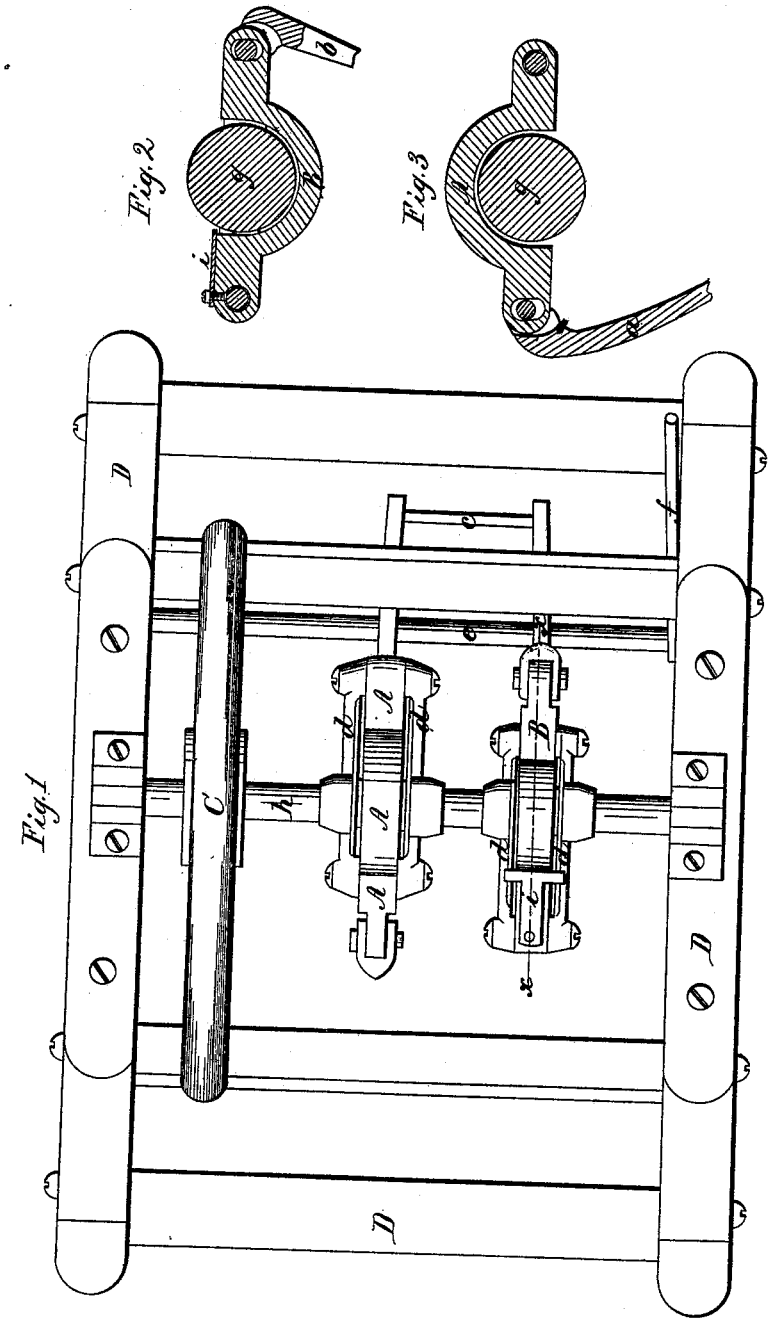

HENRY MERRIMAN, OF BLOOMINGTON, ILLINOIS.

Letters Patent No. 91,251, dated June 15, 1869.

IMPROVEMENT IN MECHANICAL MOVEMENT.

The Schedule referred to in these Letters Patent and making part of the same.

*To all whom it may concern:*

Be it known that I, HENRY MERRIMAN, of the city of Bloomington, county of McLean, and State of Illinois, have invented a new and improved Mechanical Movement or Device, that may be applied to sewing-machines, turning-lathes, velocipedes, and other machines, when it is desirable to prevent back-action or motion; and I do hereby declare the following to be a full, clear, and exact description of the construction and operation of the same, reference being had to the annexed drawings, making a part of this specification, so that others skilled in the art to which it appertains, may, from this specification and drawings, construct the same.

Figure 1 is a top view of my invention, showing its application to a sewing-machine shaft or axle, and the mode of adjustment would be substantially the same to the shaft or axle of a turning-lathe, or other analogous device, without any change in the principle or mode of operation, its adaptation being but an effort of mechanical skill and arrangement.

Figure 2 is a vertical section of the clutch B, taken in the line $x\,x$, and is similar in its general features to the clutch A, and only varies therefrom by having the spring-plate $i$ attached to the upper side of the left arm of the clutch, and placed under the disk upon the axle, instead of above it.

Figure 3 shows the clutch and its lever-connection, the former being placed above the disk, as shown in the drawing.

Upon the projections formed upon either clutch, where connection is made with the rod or lever, there is formed an oblong slot, in which the pivot attached to the rod or lever is allowed to move.

By this means, at every motion of the crank or treadle, the opposite arm or projection of the clutches is brought in contact with the disk or axle, and produces the necessary rotary motion, and with the least amount of friction; and each reciprocating movement of the treadle or crank releases one or the other of the clutches from contact with its disk or axle.

Arms or yokes are formed on each side of the clutches, fitting loosely upon the axle, and prevented from coming in contact with the disks, by means of bosses projecting from the latter.

At the end of these arms or yokes, bolts or screws, are inserted, through the arms and clutches, holding the same in a proper position upon the shaft.

The spring $i$, upon the clutch B, is used to force the opposite end of the same back to the lower portion of the slot, and is seen in fig. 2; while in the adjustment of the clutch, as seen in fig. 3, no spring is necessary, as its own weight produces the same result, owing to its being placed above the disk or axle, instead of below it.

D represents a frame-work, holding the devices shown.

C, a fly-wheel attached to the shaft $h$.

$d\,d$, arms or yokes that surround and support the clutches A B.

$e$, a shaft to which the treadle $c$ is attached, to the upper portion of which treadle are pivoted the arms or levers $a\,b$, that operate the clutches.

$f$ is a crank or lever that can be used to operate the treadle and levers $a\,b$ by hand, instead of by the foot.

Other means, well known, may be employed to operate these clutches.

What I claim as my invention, and desire to secure by Letters Patent, is—

1. The construction and arrangement of the clutches A and B, in the manner and for the purpose herein described.

2. The combination of the clutches A B with the rods $a\,b$ and treadle $c$, in the manner and for the purpose herein described.

3. The means herein shown and described, by which the clutches are adjusted to the shaft or axle, for the purposes herein set forth.

HENRY MERRIMAN.

Witnesses:
 B. F. JAMES,
 EDM. F. BROWN.